Jan. 12, 1965    J. A. HARDMAN ETAL    3,165,364
SMOOTH-RIDING SELF-CLEANING ENDLESS TRACK
Filed Oct. 25, 1961    11 Sheets-Sheet 1

INVENTORS
JAMES A. HARDMAN
ROSS W. ESKELSON

INVENTOR.
JAMES A. HARDMAN
ROSS W. ESKELSON

Jan. 12, 1965   J. A. HARDMAN ETAL   3,165,364
SMOOTH-RIDING SELF-CLEANING ENDLESS TRACK
Filed Oct. 25, 1961   11 Sheets-Sheet 5

INVENTOR
JAMES A. HARDMAN
ROSS W. ESKELSON

# United States Patent Office 3,165,364
Patented Jan. 12, 1965

3,165,364
SMOOTH-RIDING SELF-CLEANING
ENDLESS TRACK
James A. Hardman, Logan, and Ross W. Eskelson, Centerville, Utah, assignors to Utah Scientific Research Foundation, a non-profit corporation of Utah
Filed Oct. 25, 1961, Ser. No. 160,381
3 Claims. (Cl. 305—13)

This is a continuation-in-part of the application "Cleat for Vehicle Endless Track," Serial Number 92,497, filed March 1, 1961, which is now abandoned.

This invention relates generally to traction devices and more particularly and specifically to new and useful improvements in endless track structure for track-laying vehicles.

It is a general object of this invention to provide a new and useful traction cleat element and wheel guide assembly for the endless tracks of track-laying vehicles, and a principal object of the invention is to provide a smooth-riding endless track having traction cleat elements thereon which are self-cleaning during tracked vehicle operation.

Another object of this invention resides in the provision of a cleat element for a vehicle crawler track which forms an interrupted wheel guide member along the length of the track while at the same time forming a channel to receive, in engagement with elements thereof, the idler wheels of a sprocket drive assembly for the track.

Still another object of the present invention lies in the provision of a wheel-guide-forming traction cleat element for a vehicle crawler track which establishes the center portion of the track below the marginal side portions thereof thus concentrating wear on a replaceable central wear pad and also elevating the side portions of the track out of normal contact with hard, clear road and ground surfaces, thus increasing traction cleat element longevity.

A still further object of this invention is to provide a traction cleat element for a vehicle crawler track which is located centrally of the track width and includes side projecting components which transmit loads from the marginal side portions of the track to the central track portion thereby stabilizing the vehicle and concentrating load on the central, removable and renewable wear plate thereof.

Still another object of this invention resides in the provision of a unique crawler track cleat element which has provision for attachment of an extended traction device for use in deep snow, mud and the like to increase the traction of the track.

A still further object of my invention is to provide a traction and wear cleat element for a vehicle crawler track which may be readily augmented as to strength, rigidity and wearability by detachable, mated component elements.

Yet another object of this invention rests in the provision of supplemental traction and wear plate components for use in combination with the basic elements of the cleat element for adaption of a vehicle to deep ground conditions, such as snow, sand and mud.

It is an additional object of my invention to provide a traction cleat element for vehicle crawler tracks having the structural and functional attributes hereinbefore referenced, yet, which is extremely simple and inexpensive in design and manufacture and which is a durable and rugged cleat element for use in connection with the crawler track of a track-laying vehicle.

Another object of the invention is to provide an endless track construction wherein the belting thereof may be disposed substantially at, or beyond, the pitch line of the engaging sprocket.

Another object is to provide a wide tolerance sprocket and endless track combination, and to provide therein a sprocket of wide root design relative to the distances between track engagement points, so that useful life thereof is lengthened.

Another object of the invention is to provide for easy replacement of endless track components and adaptation of the tracks themselves to terrain conditions.

A further object is to preserve traction effectiveness for all types of terrain.

Still additional objects and advantages of my invention will become more readily apparent to those skilled in the art when the following description is read in the light of the appended claims and the accompanying drawings.

Referring now to the accompanying drawings in which like numerals designate similar parts throughout the several views.

Figures 1, 6:
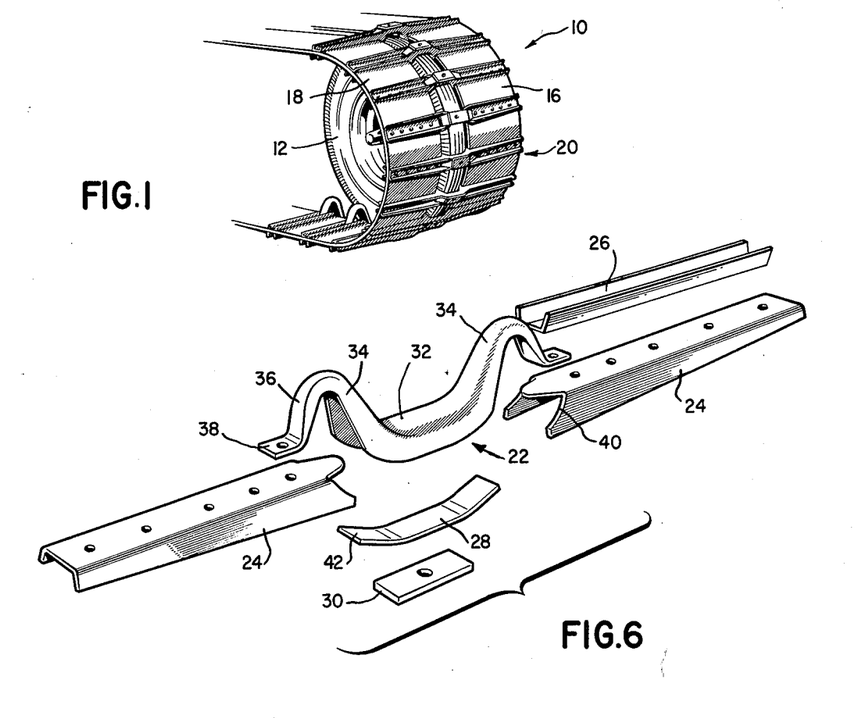
FIGURE 1 is a perspective view of a fragmentary portion of a vehicle crawler track illustrating the improved cleats secured thereto.
FIGURE 6 is an exploded view of the several components going to form each of the cleats shown assembled in the crawler track of FIGURE 1.
Figure 2:
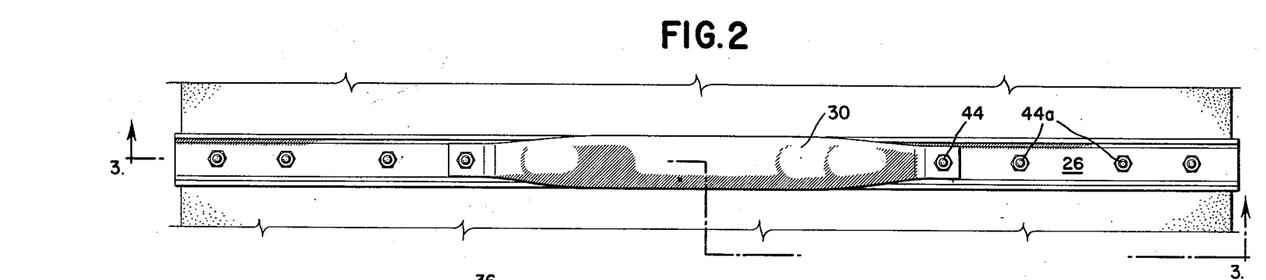
FIGURE 2 is a fragmentary plan view looking from the inside of the track and showing the top of a single cleat.

The inventive concepts of the novel traction cleat herein disclosed are illustrated in the accompanying drawings, in combination and assembly with an endless belt track, generally designated 10, of a track-laying vehicle which is provided with ground or track engaging tired wheels 12 and wherein the track is driven from powered sprocket wheels (not shown). As is seen in FIGURE 1 of the drawings the endless track 10 consists of two identical endless belts 16 and 18 which are arranged in side by side, spaced relationship on each side of the front to rear aligned row of tired wheels 12 and which are interconnected by a series of cleat elements, generally designated 20, which constitute the principal concepts of this invention. The cleat elements 20 are evenly spaced continuously along the endless belts at intervals such that they generally coincide and register with adjacent sprockets on the conventional idler and driven sprocket wheels of a track-laying vehicle.

Each cleat element 20 consists of plural components, as best seen in FIGURE 6, including a wheel guide member 22, projecting outer clamping members 24, inner reinforcing arms 26, a central support plate 28 and a central wear pad or plate 30. As will be further described in reference to FIGURES 7-9, a detachable traction extension is provided for use in deep snow, sand and the like. Members 24 and 26 together constitute, in effect, a track support means.

In the construction of the form of track cleat element shown in FIGS. 2-9 it is seen that the wheel guide member 22 is formed from a length of channel section into a generally U-shaped configuration 32 with the extended ends of the leg elements 34 thereof being curved downwardly and outward as at 36 to terminate in a horizontal stub 38 on the extreme end thereof. The inner reinforcing arms 26 are straight lengths of channel section of uniform configuration throughout their length and are of a length substantially equal to the transverse width of one of the two belts 16 or 18 of the track.

The outer clamping members 24 each consists of a straight elongated section of U-shaped configuration in cross section, which is normally inverted in assembly, with the longitudinal length along the free ends of the leg portions thereof being of greater length than the longitudinal length along the base of the U-shaped configuration. The principal elongation of the one side of each clamping member is at one end thereof, providing an arcuate end configuration 40 substantially conforming to the arcuate turn in the base of the U configuration 32 of the wheel guide member 22.

The central support plate 28 is a rectangular metallic plate, the extreme ends 42 of which are slightly bowed in the same direction above the horizontal plane of the interconnecting central section, and the central wear pad or plate 30 is case hardened metallic plate of flat rectangular configuration with substantially the same lateral dimension as the support plate but considerably shorter in longitudinal dimension than the support plate.

In assembly of each cleat member 20 with the two spaced belts 16 and 18 of the vehicle track, the wheel guide member 22 is positioned to bridge the spaced area between the belts, with the base of the U section 32 thereof projecting downwardly through the defined opening for a distance beyond the plane common to the outer faces of the two spaced belts so as to bring the undersides of the two stub portions 38 on the remote ends thereof into substantial abutment with the inner faces of the two belts. One of the inner reinforcing arms 26 is positioned perpendicular to, and lateral of, the inner face of one of the belts, with the open side of the U configuration facing upwardly or inwardly with respect to the endless belts. The underside of the stub section 38 of the wheel guide member is positioned adjacent the inner face of the bottom surface of arm 26, and reinforcing arm 26 projects a slight distance beyond that edge of the belt remote to the wheel guide member.

A normally inverted U-shaped clamping member 24 is positioned transversely of the outer side of the belt, contiguously with the reinforcing arm, and with the arcuate end 40 of the clamping member lying closely adjacent the arcuate bend of the U portion of the wheel guide member 22 from where it projects outwardly from the outer belt face, a nut and bolt assembly 44 interconnects the clamping member 24, the belt, the reinforcing arm and the stub section 38 of the wheel guide member to securely interlock these components.

Figure 3:
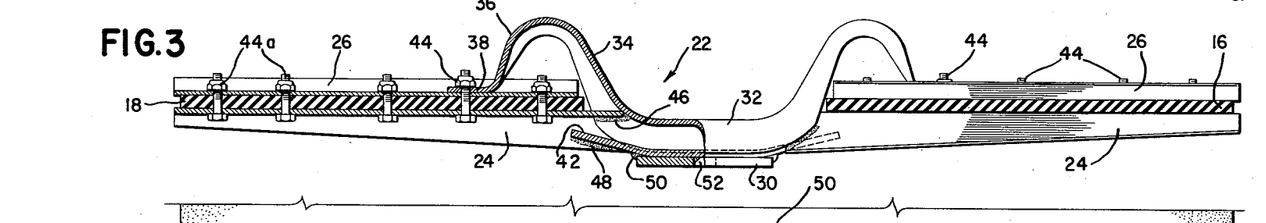
FIGURE 3 is a sectional elevation through the crawler track of FIGURE 2 taken on line 3—3.
Figure 4:
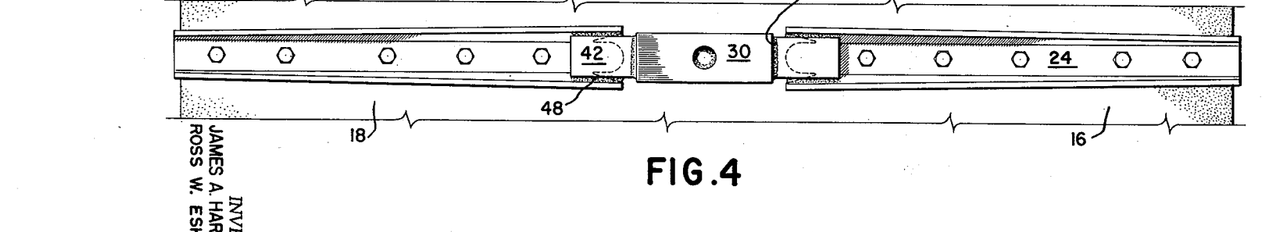
FIGURE 4 is a view corresponding to that of FIGURE 2 but looking at the bottom of the cleat from the outside of the track.
Figure 5:
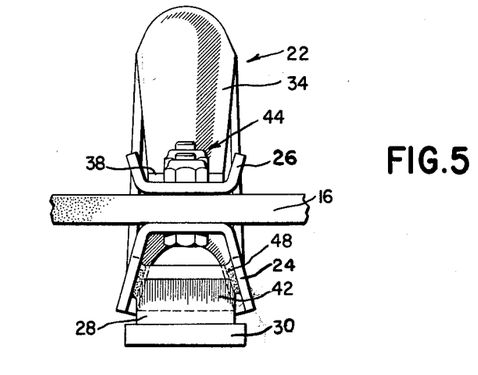
FIGURE 5 is an end elevation of the structure shown in FIGURES 2 and 3.

From FIGURE 3 it is seen that during the assembly of each side of the wheel guide assembly and its associated reinforcing arms and clamping members with the spaced belt sections, the top inner face of the clamping members 24 are welded, as at 46, to the inner side flanges of the U-shaped wheel guide member 22. The bowed ends 42 of the support plate are welded to the inner side walls of the clamping members 24, as at 48, to position the central portion thereof flush beneath the central portion of the wheel guide member. The wear pad or plate 30 is then welded, as at 50 and 52, to the underside of the support plate. Further, a series of spaced nut and bolt assemblies 44a are spaced along the length of the clamping members and reinforcing arms 24 and 26, respectively, and the belt portions, to secure the elements in place.

By the foregoing assembly construction it is seen that the belts are securely interconnected at spaced intervals along their co-extensive lengths by track cleat assemblies as described which provide on the outer faces of the belts both channel-shaped traction ribs 24 as well as a centrally depending wear pad 30 positioned to engage the ground and support the belts in marginal positions relative thereto. It is also seen that the transverse rigidity of the belts is augmented by the reinforcing arms each lying continuously with a clamping member 24; and further, that the aligned tired wheels of the vehicle ride in and are in engagement with the U-shaped wheel guide members.

Figure 7:
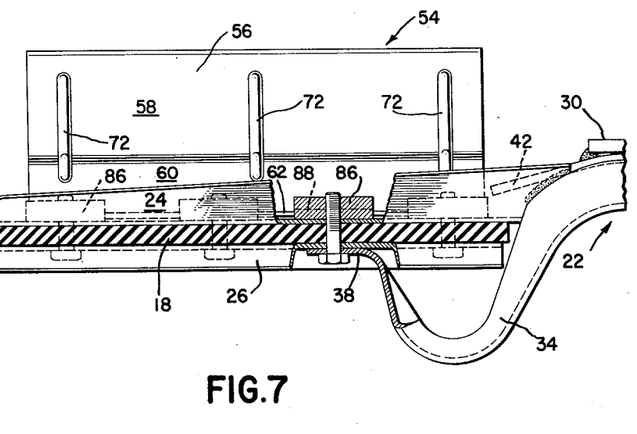
FIGURE 7 is a view similar to FIGURE 3 but inverted and illustrating the attachment of a traction extension to the cleat.
Figure 8:
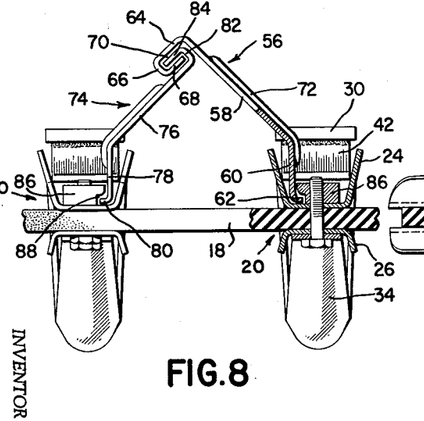
FIGURE 8 is an end elevation of the structure shown in FIGURE 7 in partial section.
Figure 9:
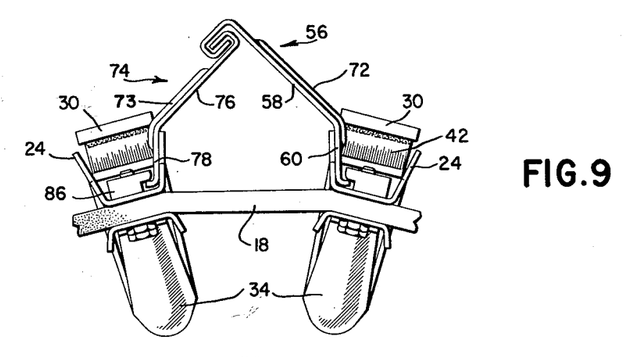
FIGURE 9 is a view corresponding to that of FIGURE 8, wherein portions of the track are flexed illustrating the automatic adjustability of the extended traction device of FIGURES 7 and 8.

In FIGURES 7 to 9 cleat elements 20, hereinbefore described, are illustrated in conjunction with a removable traction extension generally designated 54. It is to be noted that the traction extension consists of two separate and similar components which are attached one to each of adjacent paired cleat elements 20 along the length of each marginal belt portion of the track.

Each of the traction extension elements 54 consists of a pair of elongated panels of lengths substantially equal to the lengths of the clamping members 24 of the cleat elements and is provided with several offset webs and flanges to permit assembly in the manner to be hereinafter described. For example, as is best seen in FIGURE 8, one panel 56 consists of a central web portion 58 having an angularly offset web portion 60 longitudinally of one edge thereof which in turn has a substantially perpendicular stub flange 62 longitudinally of the outer edge thereof.

The second longitudinally edge of the central web portion is provided with a flange 64 perpendicular thereto, which, in turn, is provided with a flange 66 extending parallel to and spaced from the main web portion. Flange 66 is provided with a flange 68 paralleling flange 64, extending toward and perpendicular to main web portion 58 and terminating a spaced distance therefrom. The flanges 64, 66 and 68 form with the main web portion 58 a longitudinal channel 70 along the length of the panel edge. A series of spaced strengthening ribs 72 extend transversely through an intermediate portion of the panel.

The second panel 74 of the pair of panels comprising the extension is provided with a main web portion 76 having spaced strengthening ribs 73 and further having an angular offset web portion 78 along one longitudinal edge thereof which is provided, in turn, with a stub flange 80 substantially perpendicular thereto and similar to stub flange 62 of panel 56.

The opposite longitudinal edge of web portion 76 is provided with a flange 82 perpendicular thereto which, in turn, is provided with a flange 84 paralleling and spaced from main web portion 76 to form with flange 82 a hook projection along the longitudinal edge of the main web portion. The hook projection is insertable longitudinally in the channel 70 along the edge of panel 56 to interlock in loose joint manner the adjacent longitudinal edges of panels 56 and 74.

As is also best seen in FIG. 8, the remote edges of panels 56 and 74 are each provided with like stub flanges 62 and 80 which project in opposite directions when the panels are interlocked as described. The ends of the panels remote from their common joint are each positioned within an open topped U-shaped clamping member 24 of two adjacent spaced cleats. A series of nut blocks 86 are secured to the bolts of the nut-bolt assemblies 44 and 44a within the clamping members to lock the stub flange portions of the panels beneath the undercut channels 88 of the blocks, thereby securing the panels to the reinforcing ribs and cleats. A triangulated, tent-like projection is thus formed betwen adjacent pairs of clamping members 24 along the length of each marginal belt portion of the track so that projected track extensions are provided from the ground engaging face of the track to effectively increase the driving traction of the vehicle when it is operated in heavy snow, deep sand, and the like.

FIG. 9 illustrates the functional attributes of the traction extension assemblies wherein the loose interlocked joints between the stub flanges of the panels of each extension and the clamping members 24 have sufficient flexibility to permit the track to flex and to be carried around the end sprocket wheels and idlers upon which the track is mounted and by which it is driven.

The removable attachment of the extension elements is unique in that the stub flanges forming the hook-like elements 62 and 80 are located immediately adjacent the plane or line of the track 18 and, thus, the movement of the hinged connections of the extension plates relative to the track is held to a minimum.

Figure 10:
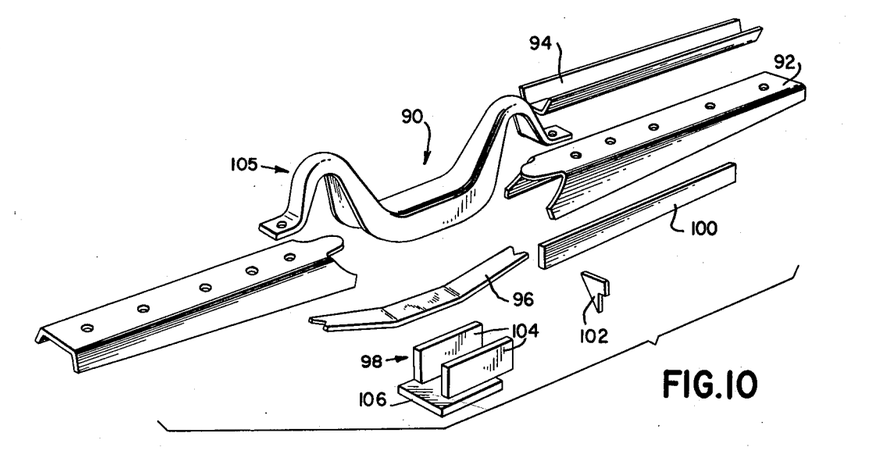
FIGURE 10 is a view similar to FIGURE 6 of the cleat modified by the addition of the supplemental traction components.
Figure 11:
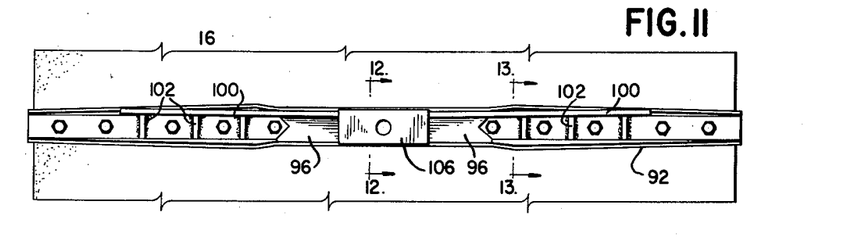
FIGURE 11 is a bottom view of the assembly of the components of FIGURE 10.

In FIG. 10 of the drawings there is illustrated a form of track cleat similar to that illustrated and described in respect to FIGS. 1 to 6 of the drawings, modified by the addition of extended traction components. The cleat form shown in FIG. 10 consists of a wheel guide member 90 which is identical to wheel guide member 22 previously described; projecting outer clamping members 92 similar to previously described clamping members 24; inner reinforcing arms 94 similar to previously described arms 26; a central support plate 96 similar to plate 28 earlier described; an extended wear plate assembly 98 replacing earlier described wear plate 30; and supplemental traction bars 100 secured longitudinally to the outer rib members 92.

In assembly of the modified cleat the channel-shaped reinforcing arms 94 are secured to end projecting stub portions of the wheel guide member 90 and project therefrom in the manner previously described. A channel-shaped clamping member 92 is positioned longitudinally beneath each of the arm members 94, with the flexible belt 16 sandwiched therebetween, and is secured to the arm through the belt by nut and bolt fasteners in the manner previously described. Each of the clamping members 92 is provided with an elongated traction bar member 100 which is positioned longitudinally beneath that depending portion of the clamping member disposed rearwardly from the forward direction of travel of the cleat with the belt when the vehicle is moved in a forwardly direction. Each traction bar member 100 is secured by means of a series of triangular plates 102 which abut the forward face of the traction bars along a portion of one side thereof, with an adjacent side abutting the inside of the base portion of the U-shaped clamping member 92. The triangular plates are welded throughout the length of their edge abutments with the clamping member 92 and the traction bar 100. These triangular plates rigidly suspend the traction bars from beneath the rearwardly depending portion of the clamping member. The triangular plates 102 are secured, as described, at spaced intervals longitudinally of the length of each of the clamping members. The free end of each of the traction bars terminates beneath the adjacent end of the central portion of the guide member 90.

Intermediate the inner opposed ends of the oppositely extending clamping members 92 and traction bars 100 the wheel guide member 90 is provided with an elongated support plate 96 which extends transversely of the underside of the wheel guide member and is welded thereacross. The ends of the plate extend within the ends of channel-shaped rib members 92 and project beyond the ends of the guide member for a distance.

Directly beneath the central portion of the guide member 90 the support plate 96 supports two transversely spaced vertically disposed plates or bars 104. These depend below the underside of the support plate to a point substantially in coincidence with the plane defined by the free edges of the adjacent projecting traction bars 100. A flat wear plate 106 is secured transversely across and beneath the plates 104, with the thickness of the wear plate 106 bringing its undersurface into a horizontal plane slightly below the plane of the lowermost edges of the adjacent projecting traction bars 100.

Thus, from the foregoing it is seen that a cleat element 105, similar to that previously described, and having all of the attributes of the earlier described structure 20, has been provided. This cleat element incorporates a central wear plate projecting for a predetermined distance below or outwardly from the underside of the wheel guide member and projecting traction bars having substantially equal extensions outwardly from the center of the cleat element. The projecting traction bars serve to increase the traction of the endless belt in that they provide extensions for engaging loose ground cover such as sand or snow which tends to support the flat areas of the usual endless belt.

Figure 12:
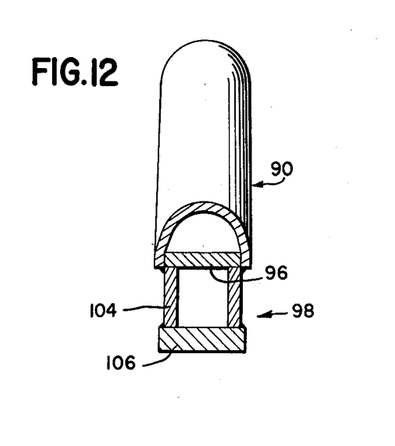
FIGURE 12 is a vertical section taken on line 12—12, FIGURE 11.
Figure 13:
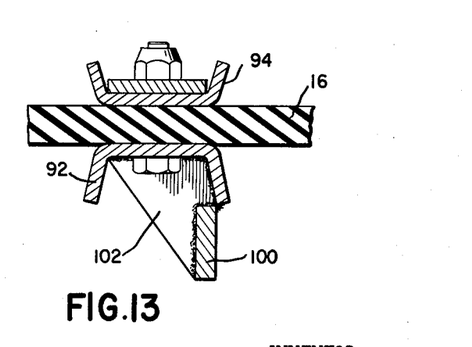
FIGURE 13 is a vertical section taken on line 13—13, FIGURE 11.
Figure 14:
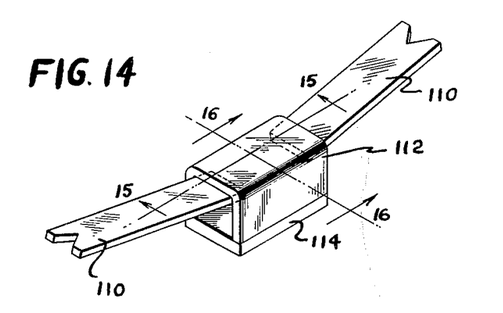
FIGURE 14 is a perspective view of a modifier wear pad extension.
Figure 15:
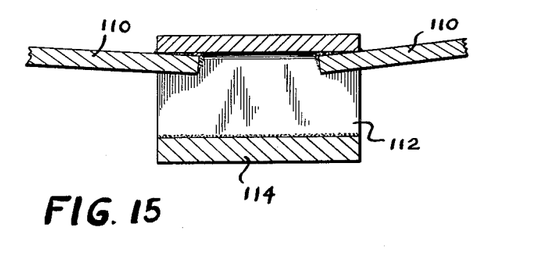
FIGURE 15 is a vertical section taken on line 15—15, FIGURE 14.
Figure 16:
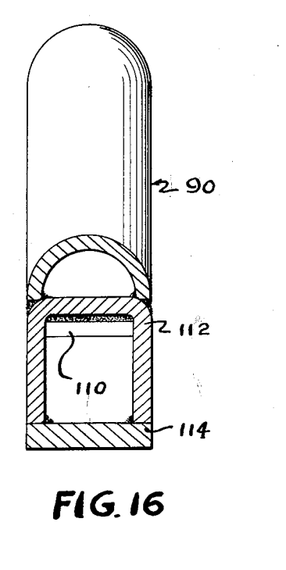
FIGURE 16 is a vertical section taken on line 16—16, FIGURE 14.

FIGURES 14 through 16 disclose a modified form of the support plate—wear plate structure of FIGURES 10 and 12. In this modified form the support plate 110 is formed in two parts each of which is secured, by weld or the like, to an inverted U shaped member 112 which replaces the spaced bars 104 earlier described. A wear plate 114 is secured across the lower open end of the U-shaped member, and when the top of the element 112 is secured beneath a guide member 90 the wear plate projects therebeneath to engage the ground as described in respect to plate 106.

Figure 17:
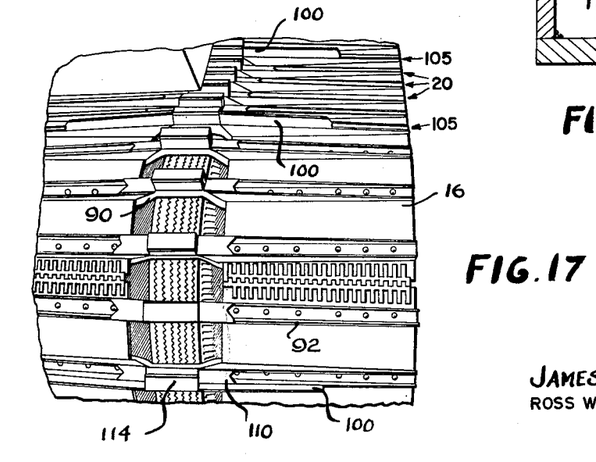
FIGURE 17 is a fragmentary pictorial view of a track embodying the modifications of FIGURES 10 and 16.

FIGURE 17 discloses the use of the projected traction bars 100 on a track construction such as has been described. These traction bars may be spaced at intervals along a track to provide increased traction or these traction bars may be placed in close relationship along the length of a track to provide increased flotation, carrying capacity and smoothness of ride.

Figure 19A:
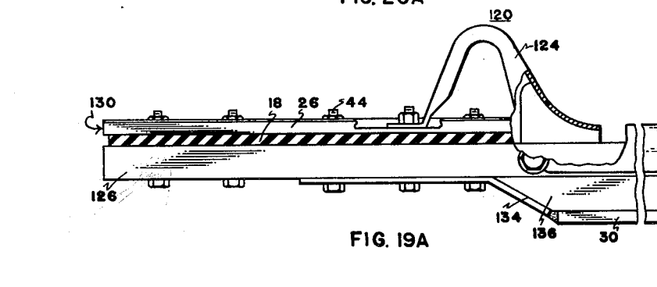
FIGURES 19A, 20A and 21A are sectional elevation, top, and bottom views of a portion of one type of cleat structure utilized for the present invention; correspondingly.
Figure 19B:
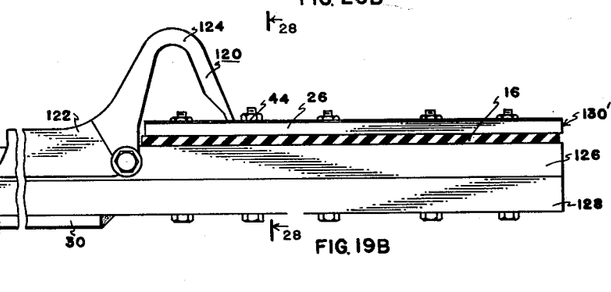
FIGURES 19B, 20B, and 21B are sectional elevation, top and bottom views of an opposite half of yet another cleat construction. For convenience of illustration, only one half of each type of cleat construction is shown in the respective figures.
Figure 20A:
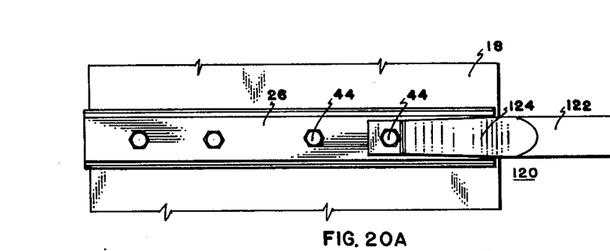
Figure 20B:
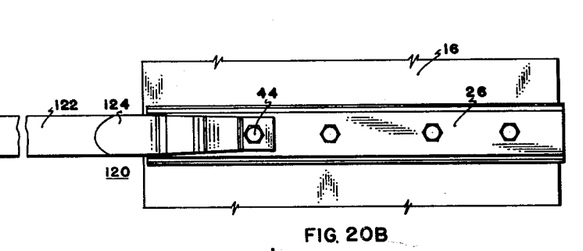
Figure 21A:
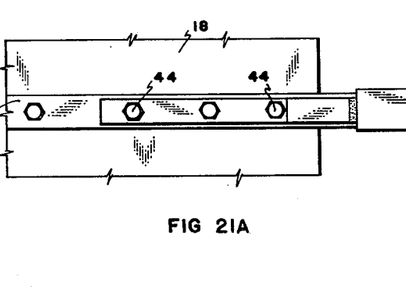
Figure 21B:
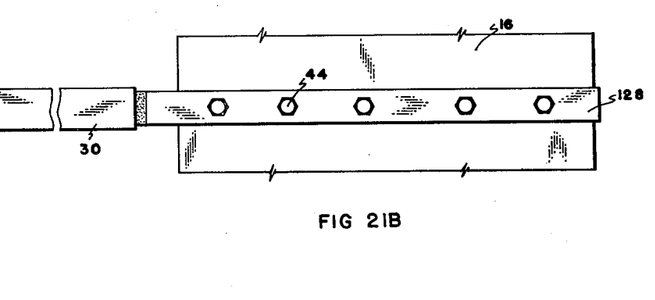

FIGURES 19A, 20A, and 21A illustrate elevation, top, and bottom views of a representative half of another type of low cleat element 130 corresponding to the low cleat element shown in FIGURES 2–6. FIGURES 19B, 20B, and 21B illustrate a representative half of another type of high cleat element 130' which is interspaced between chosen ones of the track cleat elements 130 and which corresponds to the high cleat element shown in FIGURES 10–13. For convenience of illustration, only a half of each type of cleat is shown.

Looking first at FIGURES 19A, 20A, and 21A, wherein cleat element 130 is shown fixed to endless belt 18. Belt 18 is supplied with a transverse clamping member 126, which is secured to the belt (and also to the endless belt 16, not shown) and inner reinforcing arms 26 by nut and bolt attachments 44.

FIGURES 19B, 20B and 21B illustrate the second type of track cleat, 130', wherein, in addition to the nut and bolt assembly attachments of the clamping member 126 through endless belt 16 and inner reinforcing arm 26, there is also supplied a fixed traction plate or bar 128 fixedly secured to the bottom surface of clamping member 126. As shown, the nut and bolt assemblies 44 may be employed to secure all four members together in the manner illustrated and the bolt heads or nuts thereof caused to protrude below the bottom surface of the cleat 128 or the traction plate can be fixed to the clamping member by welding, or the like.

In any event, a central wear plate 30 is welded or otherwise affixed to the extended traction plate 128 of cleat element 130', and to an angulated strap 134 and intermediate integral structure 136 of cleat element 130.

Figures 22, 23, 24, 25, 26, 27, 28:
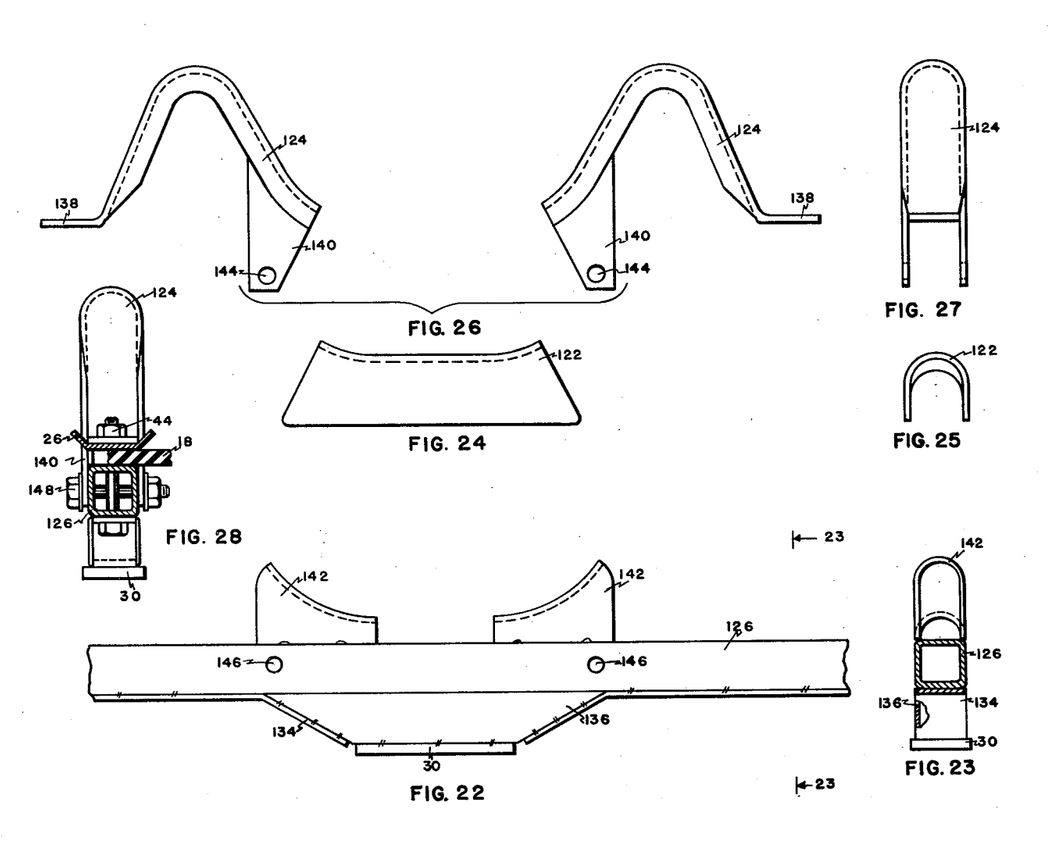
FIGURE 22 is a fragmentary view of a representative cleat structure employing upwardly disposed, fixed stay lugs; it will be observed that both types of cleat structures (i.e. either FIGURES 19A, 20A, and 21A or FIGURES 19B, 20B, and 21B) will employ the fixed stay lugs shown.
FIGURE 23 is a cut-away sectional view taken along the line 23—23 in FIGURE 22.
FIGURE 24 is a detail of the central tread member utilized in the composite tire guide structure of both types of track cleats in the invention.
FIGURE 25 is an end view of the structure shown in FIGURE 24.
FIGURE 26 is a view of right and left tire guide members of the composite tire guide construction.
FIGURE 27 is an end view of a representative one of the tire guide members of FIGURE 26.
FIGURE 28 is a section taken along the line 28—28 in FIGURE 19B.

Composite wheel guide members 120 of FIGURES 19A, 19B, 20A and 20B are mounted to the rest of the cleat member structure, as shown, and include members 122 and 124 which may either be integral or separate parts (as shown). Members 122 of FIGURES 19B, 20B, and 21B, are also illustrated in FIGURES 24 and 25 in detail. Members 124 of the previously mentioned figures are detailed in FIGURES 26 and 27 and, as shown, include top mounting ears 138 and side mounting flanges 140.

Fixed stay lugs 142 in FIGURE 22 are shown welded or otherwise permanently secured to track clamping member 126. This is true of both cleat member 130 and cleat member 130'. As shown, flanges 140 in FIGURE 26 are apertured at 144 and correspond for mounting purposes to apertures 146 through member 126.

It should be noted at this juncture that while the parts 122, 124 in FIGURES 24 and 26 may be separate as shown, conceivedly they might be formed integral. However, notwithstanding the above, the fixed stay lugs 142 in FIGURE 22 will still be used in both cases, for the purpose of applying additional rigidity to the structure without the employment of further attachments such as additional bolts. Nut and bolt attachment 148 (see FIGURE 28) are employed to secure flanges 140 of members 124 to track support members 126 at apertures 144.

Figures 29, 30, 31, 32, 33:
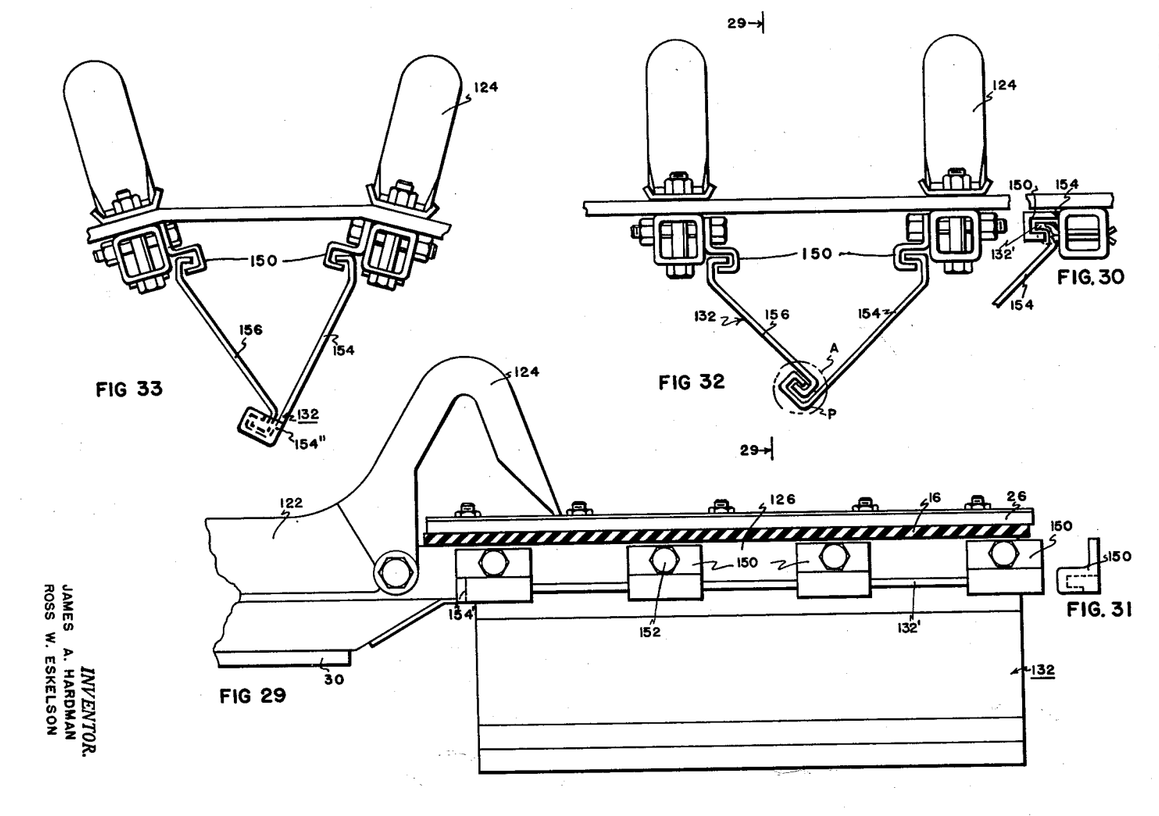
FIGURE 29 is an enlarged fragmentary, partially sectioned view, similar to FIGURE 19A, for example, but illustrating the removable mounting of deep traction cleat structure in between adjacent track cleats, in a manner as illustrated in FIGURE 18, and is taken along the line 29—29 in FIGURE 32.
FIGURE 30 is a partial, fragmentary view of one type of mounting structure for the deep traction cleat of FIGURE 29.
FIGURE 31 is an end view of a representative one of the retaining guides illustrated in FIGURE 29.
FIGURE 32 is a horizontal fragmentary view of a portion of the endless track of the present invention when that portion thereof incorporates the removable deep traction cleat of the invention.
FIGURE 33 is similar to FIGURE 32 but illustrates the endless track contour at that portion experiencing a rise in the terrain.

FIGURE 29 illustrates a method of attachment of removable deep traction extensions 132 to the track structure illustrated in FIGURES 19A–20B. For this there will be preferably provided a plurality of retaining guides 150 which may be appropriately apertured and retained by respective nut and bolt attachments 152 for securement thereof to clamping member 126, or, guides 150 may be welded to the cleat structure as shown in FIGURE 30 at 154. In lieu thereof, other suitable means to make a guide or a race lane for flanges 132' of deep traction extensions 132 may be used. In any event, the innermost retaining guide should be "blind" or closed at its end so that the removable deep extensions 132 will not slide therebeyond. Correspondingly, the outermost retaining guide 150 as in FIGURE 29 should also be "blind" or closed so that when the guide is secured to clamping member 126 the removable deep extension cleat will not slide outwardly therebeyond.

FIGURE 31 illustrates an outermost one of the retaining guides 150 and, as shown, is closed at its end so that once the retaining guide 150 is positioned by its nut and bolt or other attachments, the removable traction cleat will not slide therebeyond. The dotted line 154' shown in FIGURE 29 also illustrates that, preferably, there should be a closed or blocking portion associated with the innermost retaining guide 150 so as to preclude the cleat from sliding inadvertently therebeyond. It will be noted at this point that if both inside retaining guides 150 are "blind" or provided with blocking means, then, where an outside end of one of the angulated panel members 154 of deep traction extension 132 is also made blind or closed, then but one bolt or nut and bolt set of attachments need be employed to secure the entire extension 132 in its releasably secured position as a two-piece assembly. The remaining deep extension cleat panel member 156 will be held in a suspended position by its inside "blind" retaining guide and by the "blind" or blocked end 154" of the remaining panel member 154.

It will be seen with reference to FIGURES 32 and 33 that the panel members 154 and 156 of each of the removable deep traction extensions 132 are secured together at their inter-cooperating formed outer margins by respective folded-over configurations as shown within the phantom arcuate line A in FIGURE 32. This hinge or swinging type of connection, in combination with the loose, movable coupling of flanges 132' with guides 150, in as close proximity to the belts 16 and 18 as practicable for diminishment of the hinge movement effect, enables a very satisfactory inter-cooperation of parts which are very inexpensively manufactured. Further, the lowermost apex P of the cleat member construction is reinforced by that margin of the remaining cleat member which reinforces it at this wearpoint.

Further, it will be noted in connection with FIGURE 33, that where the track traverses arcuate end areas thereof or is deflected by a bump in the terrain, inter-member panels (154, 156) have sufficient flexibility that movement of the deep traction extensions 132 is provided for, as shown in FIGURE 33, and no damage will occur to the cleat member construction. Rigid connections of the two integral parts of the deep traction extensions 132 would generally not be satisfactory in operation, especially where the cleat members are traversing relatively hard or rough terrain. Furthermore, as previously mentioned, such flexibility is needed in order to insure that tracks traversing the end wheels or sprockets of the track driving means of the vehicle.

Figure 18:
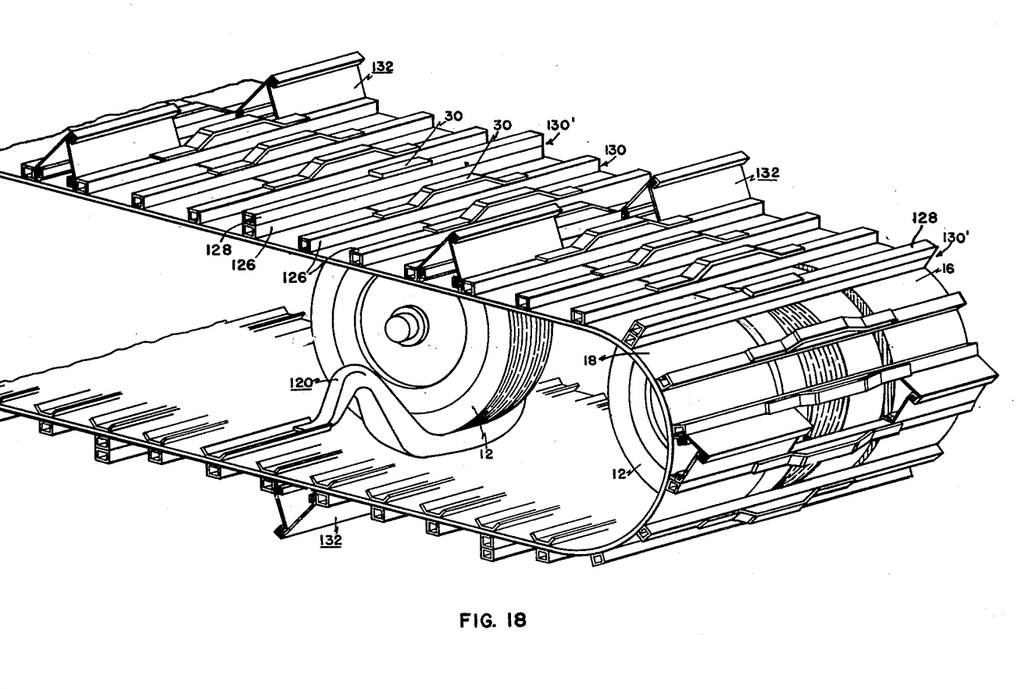
FIGURE 18 is a fragmentary, perspective view showing part of an optional endless track construction according to the present invention wherein, if desired, the track belting thereof may be disposed outside of the pitch line of the driving sprocket.

Reference is now made to the complete crawler track shown in fragmentary perspective view in FIGURE 18. The track, preferably of split construction and including inner and outer rubber belts 16 and 18, has incorporated within the structure thereof a multiplicity of track cleat elements 130 and 130', and also includes spaced, deep traction extensions 132 which are removably secured to the structure. All of the cleat elements 130 and 130' include respective, wheel or guide structure 120 which are interspaced a relatively short distance apart, e.g. 4½ inches for wheels of conventional size. Wheels 12 should be made as large as possible in comparison to cleat interspacing so that the ride obtained will be as smooth as possible. While the wear pads 30 of cleats 130 have a slight penetration effect, to assist in the obtaining of desired traction, their main purpose is to provide a smooth riding base for the track when the vehicle is used on a solid ground cover.

At this point, it is important to observe that if the high cleat elements (130') were disposed as close together on the outside of the track as the wheel or tire guides are on the inside of the track, then, should the vehicle be traversing wet ground, mud or snow, there would be a shearing off of the terrain so that a flat bottom track would result, since the material sheared off would necessarily serve as filler segments between the closely interspaced track support members. In the present invention, however, the high track cleat elements 130' are spaced apart a distance substantially greater than the interspacing between adjacent low cleat elements 130. Cleat members 130', for example, are present at every fifth wheel guide disposition as shown. It will be noted that a wear plate 30 is disposed on the bottom side of each of the cleat members 130' or so that the same will come in contact with the terrain in the same manner as the wear plate 30 associated with track cleat elements 130. Thus, when hard ground is encountered a smooth ride will be obtained, this because the traction structure of cleat elements 130' will always be above the wear plate line, thereof. In practice, these cleat elements 130' should be spaced apart so they will occur at every fourth or fifth cleat position as shown. The optimum spacing between cleat elements 130' will depend, of course, upon terrain conditions. However, the interspacing should be such, regardless of the terrain condition, that for the speed range of the vehicle employing the track, the terrain will not tend to fill up the spacing between adjacent cleat elements. In practice, a minimum inter-cleat element (130') distance of perhaps 18 inches should be observed.

There will be a cleaning effect at the front and rear ends of the track where it traverses the sprocket and front wheel areas because of the short radius of curvature of the track at these points. However, in order for the cleaning effect in these two areas to be effective, it is necessary that cleat elements 130' be spaced apart so that such material as might tend to accumulate at a particular cleat will be shaken off at the end areas. In this connection, it should be noted that loose terrain packed between adjacent high cleat elements 130' is forceably dislodged by the end wheels and the belts themselves as they turn around the end wheels. This is because the material packed between adjacent traction bars 100 (FIGURES 10-13 and 17) or 130' (FIGURES 18-21B) is caked in substantially straight line formation that cannot bend around the end curve of the belts without being pushed from between the traction bars by the curvature of the belts.

The deep traction extensions 132 are also selectively mounted upon the track when snow, particularly deep snow, or other extremely loose ground cover is to be encountered by the vehicle. It should be noted at this point that in such cases it may well be that the deep traction extensions 132 will be spaced apart a distance equal to or perhaps farther than that between the cleat elements 130'. However, an approximate equal spacing is illustrated in FIGURE 18. Sufficient retaining guides 150 in FIGURE 29 will be supplied for all the cleat elements which might possibly be used for mounting purposes in connection with the traction extensions 132, so that the extensions 132 may be positioned at appropriate intervals as desired.

It will be observed that the deep traction extensions 132 extend below the wearpads 30 of the track; thus, when hard ground is about to be traversed and a smooth ride is desired, it will be necessary that the deep traction cleats 132 be removed and reserved in the vehicle for future deep snow or other special use requirements.

Figure 34A:
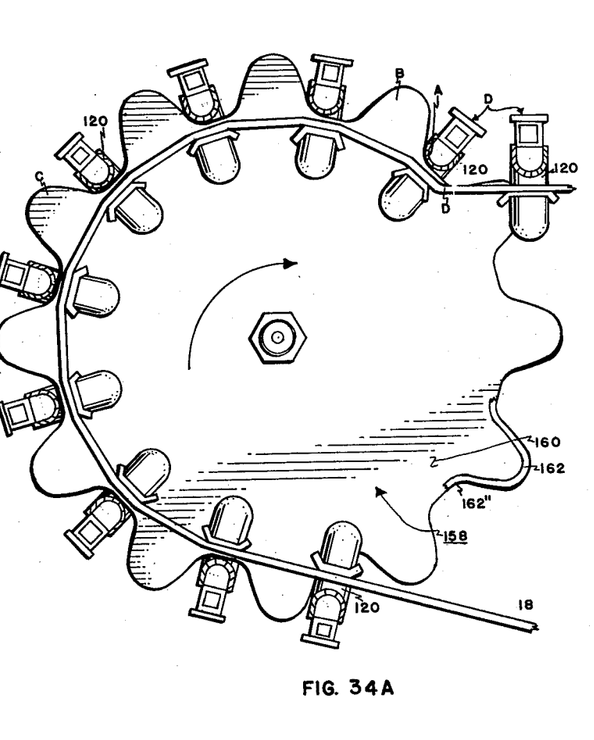
FIGURES 34A and 34B are enlarged, fragmentary, partially schematic representations of the manner of engagement of a vehicle sprocket with one form of endless track of the invention, FIGURE 34A illustrating such engagement when the sprocket is new and FIGURE 34B illustrating inter-engagement when the sprocket is at the end of its useful life.
Figure 34B:
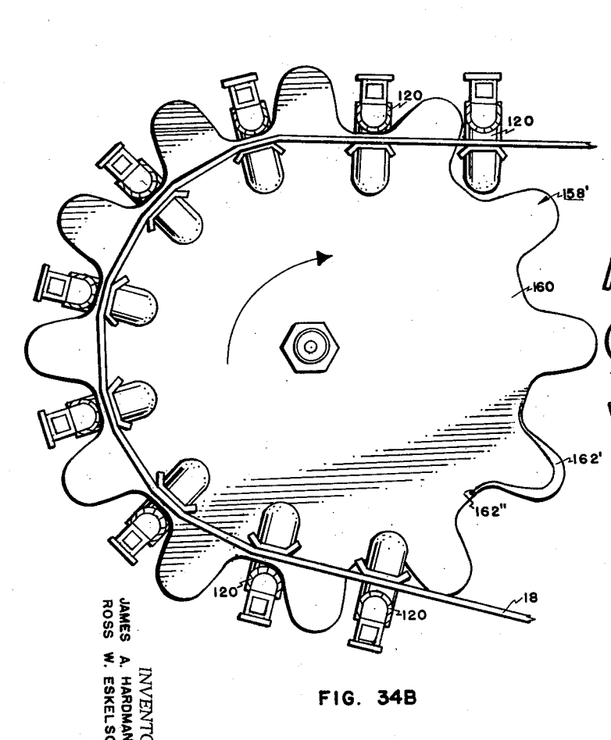

FIGURES 34A and 34B illustrate, partially in schematic and fragmentary form, the intercooperation of a drive sprocket 158 of the vehicle with the endless track thereof according to the present invention. The track as shown in FIGURES 34A and 34B is the same as that shown in FIGURES 2 through 4 of the drawings and represents the situation wherein the track belt is inside of the pitch line of the sprocket.

We should now discuss the nature of the sprocket which should be used for work in cold regions or in applications in general wherein vehicle structure must be light, e.g. in order to go over snow. In such a situation the drive sprocket or sprockets to be used, as indicated at 158 in FIGURE 34A will have a principal member 160 of metal and a tooth covering 162 (shown broken away but actually disposed completely about the periphery of the sprocket) of resilient material such as rubber. The rubber forming the layer 162 may be vulcanized directly to the metal 160 of the sprocket in a conventional manner. The rubber used avoids metal-to-metal contact and the wear attendant therewith; furthermore, the rubber will prevent an icing up of the track with the sprocket in cold weather. As to condition of the rubber employed, there should be some resiliency in the material so as to avoid a chipping off of the rubber coating of the sprocket by the track.

Now when a resilient rubber coating is used for a sprocket as is had here, then for heavy loads the track will penetrate the sprocket, so to speak, by deforming the rubber at those points at which the track engages directly the sprocket. Since the deformation of the rubber coating alters the root diameter of the sprocket, effectively shortening the distance between the teeth, then the cord length of the belt (16 or 18) in this depressed condition actually becomes too great to fit against the teeth of a normal sprocket to engage progressively successive teeth of the sprocket. In order, then, for one to preclude the track, by virtue of its fixed chord length, from climbing the teeth of the sprocket as the track progresses therearound, it becomes necessary to widen the root width of the sprocket between adjacent teeth, with respect to the distance between adjacent drive points of the belt, over that of the design of a conventional involute tooth design.

The following discussion relates to choosing the chord length of the endless track, i.e. the dimension center-to-center between adjacent drive points of the tire guides 120 at the central tread members thereof. The sprocket 158 drives the endless track by the sprocket teeth engaging the central tread members 122 of the several composite wheel guides 120. FIGURE 34A illustrates the situation wherein the sprocket 158 is new and the rubber area 162 thereof is unworn at each of the root areas 162″. In such event, in FIGURE 34A the central tread member of composite tire guide 120 at A receives substantially the entire thrust of sprocket 158 by the sprocket tooth B adjacent thereto. Since the root width of the sprocket is enlarged in is new condition, the teeth progressively rearward of the contacting tooth B perform less and less work until, perhaps at tooth C substantially no work is being performed by such tooth, (C), against the composite tire guide which the tooth, (C), engages.

Now, as the rubber 162 on sprocket 158 is either worn or is depressed through heavy loads, then successively more and more teeth of the sprocket come into engagement with their respective composite tire guides 120 at the respective central tread members 122 thereof. Ultimately, however, the rubber coating 162 will become thinner and thinner (see 162′ in FIGURE 34B) so that the sprocket wear out and, at this point, the situation at 34B will exist. The important thing is that the sprocket and inter-wheel-guide spacing be such that when a new sprocket is installed, one is working on the high side of the life cycle of the combination. This is illustrated in FIGURE 34A. As wear commences, then more and more teeth will come into engagement with their respective, adjacent, composite tire guides so that more of the latter will be driven simultaneously. Then for a long period of time the composite tire guides 120 will all receive thrust from the respectively engaging sprocket teeth so that long life of the sprocket-track combination will be assured.

One disadvantage in connection with the configuration of FIGURES 34A and 34B is that where, as therein shown, the track is inside of the pitch line of the sprocket, there will result some "chewing off" of the rubber coating of sprocket 158 at tooth B, this by virtue of the new condition of the sprocket and the immediate contact of tooth B at A of the track. Also, it will be seen in connection with FIGURE 34A that there is an abrupt direction change or pinching effect of the endless track cleat against sprocket tooth B and as at D as the track is advanced beyond the heavily loaded sprocket tooth at B.

Figure 35A:
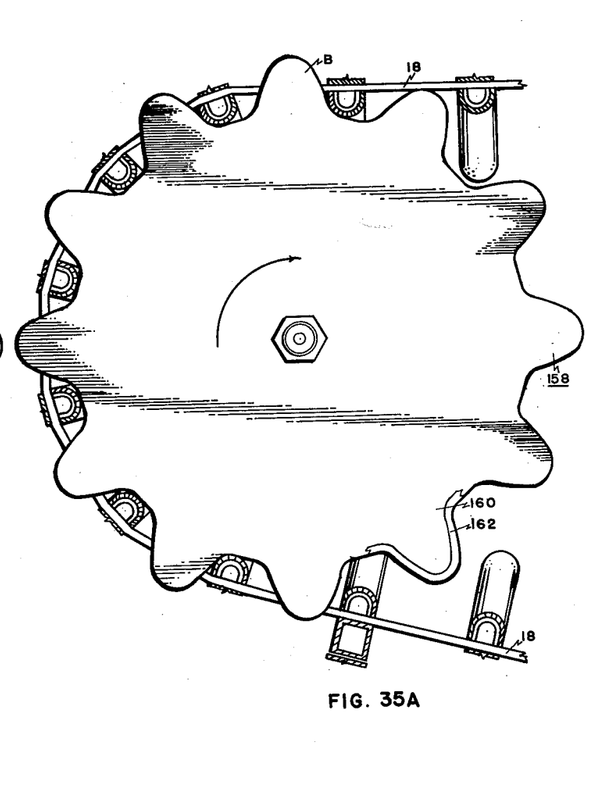
FIGURES 35A and 35B are enlarged, fragmentary, partially schematic illustrations of the inter-engagement of a vehicle sprocket and another type of endless track construction according to this invention, with FIGURE 35A illustrating the sprocket when it is new and unworn and FIGURE 35B illustrating the engagement when the sprocket is at the end of its useful life.
Figure 35B:
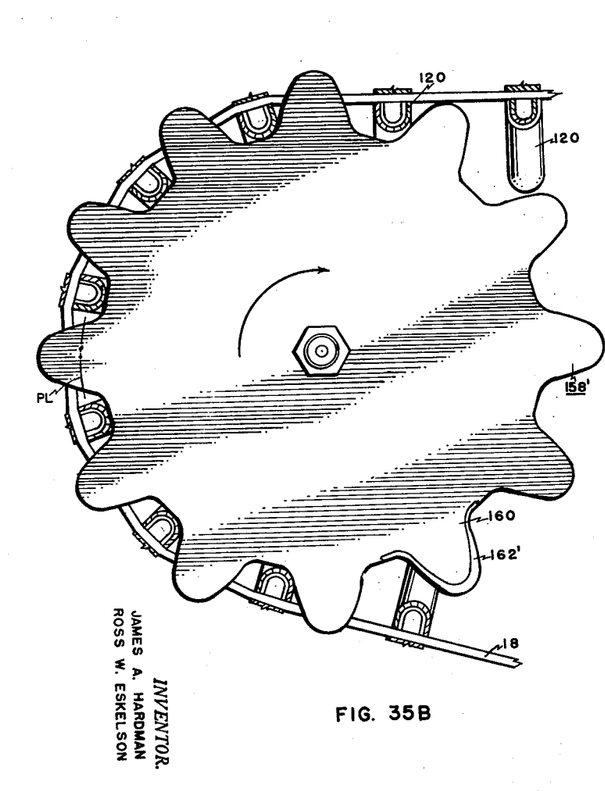

These two rather undesirable situations can be avoided by the design illustrated in FIGURES 35A ("new condition") and 35B ("worn condition"), see also FIGURE 18, wherein the rubber belting of the track is disposed radially greater or beyond the pitch line PL of the sprocket. In such a situation, see FIGURE 35A, all pinching effect as here and above noted is avoided. Thus, at the time of disengagement of the track at 18 from the sprocket 158 (at driving tooth B) there is an opening up of the condition of engagement to disengagement in contra-distinction from the situation at tooth B in FIGURE 34A. However, the design criteria for proper sprocket engagement with the track obtains in FIGURE 35A at tooth B as in the case of FIGURE 34A at tooth B. Thus distance between adjacent teeth of sprocket 158 (158′ in FIGURE 35B) will be enlarged with respect to the distance, center-to-center, between mounting locations of the composite tire guides on the track belts. The rubber covering 162 of metal sprocket 160 is as before mentioned.

It will be noted that the desirable situation of FIGURE 35A (the worn-out condition being shown in FIGURE 35B) is easily attained by the inventor's construction as illustrated in FIGURE 18 (see also FIGURES 19 through 27).

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

We claim:

1. A crawler track including, in combination: endless belt means; a plurality of first track cleat elements transversely disposed in mutually spaced relationship across said endless belt means and rigidly secured thereto, said first track cleat elements including respective separate wheel guide means opening inwardly with respect to said endless belt means, respective wear plates rigid with the wheel guide means and outwardly oriented with respect to said endless belt means, and lateral track clamping members secured to said endless belt means; a plurality of second track cleat elements transversely disposed in mutually spaced relationship across said endless belt means and rigidly secured thereto, said second track cleat elements also including wheel guide means opening inwardly with respect to said endless belt means, respective wear plates fixed to the wheel guide means and outwardly oriented with respect to said endless belt means and in line with the wear plates of said first track cleat elements, clamping members secured to said endless belt means, and laterally extending fixed traction bars secured to said clamping members, said second track cleat elements being interposed between first track cleat elements so that the distance between adjacent second track cleat elements is greater than the distance between adjacent wheel guide means, said laterally extending fixed traction bars extending from the clamping members outwardly to a point between the said track clamping members of said first track cleat elements and the surface of the wear pads such that the outer surface of the wear plates of said first and second track cleat elements are located substantially the same distance from said belt means.

2. A crawler track including, in combination: endless belt means; a plurality of first track cleat elements transversely disposed in mutually spaced relationship across said endless belt means and rigidly secured thereto, said first track cleat elements including respective wheel guide means opening inwardly with respect to said endless belt means, respective wear plates rigid with the wheel guide means and outwardly oriented with respect to said endless belt means, and lateral track clamping members secured to said endless belt means; a plurality of second track cleat elements transversely disposed in mutually spaced relationship across said endless belt means and rigidly secured thereto, said second track cleat elements also including wheel guide means opening inwardly with respect to said endless belt means, respective wear plates fixed to the wheel guide means and outwardly oriented with respect to said endless belt means and in line with the wear plates of said first track cleat elements, clamping members secured to said endless belt means, and laterally extending fixed traction bars secured to said clamping members, said second track cleat elements being interposed between first track cleat elements so that the distance between adjacent second track cleat elements is greater than the distance between adjacent wheel guide means, said laterally extending fixed traction bars extending from the belt means outwardly to a point intermediate the said track clamping members of said first track cleat elements and the surface of the wear pads most remote from the endless belt means; and a plurality of deep traction extensions releasably secured to selected pairs of adjacent track cleat elements, said deep traction extensions extending from the cleat elements outwardly beyond the wear plates and being mutually spaced apart a distance greater than the spacing between adjacent wheel guides.

3. Structure according to claim 2, wherein said deep traction extensions comprise angulated panel members joined together in an apex at cooperating, formed, margins, and wherein the track cleat elements securing said deep traction extensions include guide means, slideably receiving laterally said deep traction extensions, and means for releasably securing said deep traction extensions in place in said guide means.

References Cited in the file of this patent

UNITED STATES PATENTS

| | | |
|---|---|---|
| 1,774,797 | Knox | Sept. 2, 1930 |
| 2,419,522 | Acton | Apr. 29, 1947 |
| 2,707,658 | Grenier | May 3, 1955 |
| 2,749,189 | France et al. | June 5, 1956 |
| 2,893,787 | Nodwell | May 29, 1958 |
| 3,020,095 | Backhaus | Feb. 6, 1962 |

FOREIGN PATENTS

| | | |
|---|---|---|
| 517,867 | France | Dec. 22, 1920 |
| 810,447 | France | Dec. 28, 1936 |
| 613,564 | Great Britain | Nov. 30, 1948 |
| 478,066 | Canada | Oct. 30, 1951 |